H. C. TULLY.
RAILWAY MOTOR CAR.
APPLICATION FILED JULY 26, 1915.
1,215,083.
Patented Feb. 6, 1917.
2 SHEETS—SHEET 1.
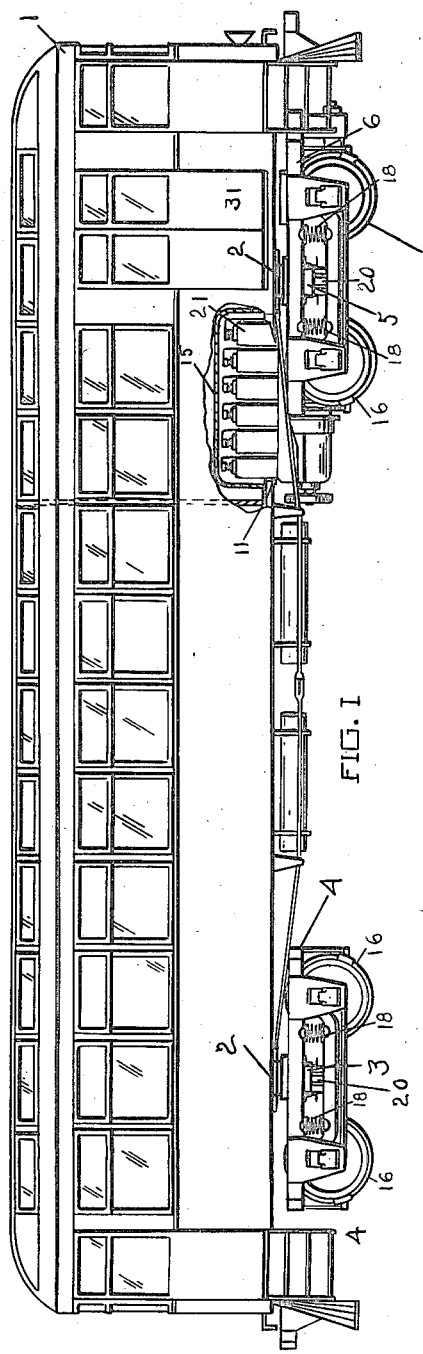
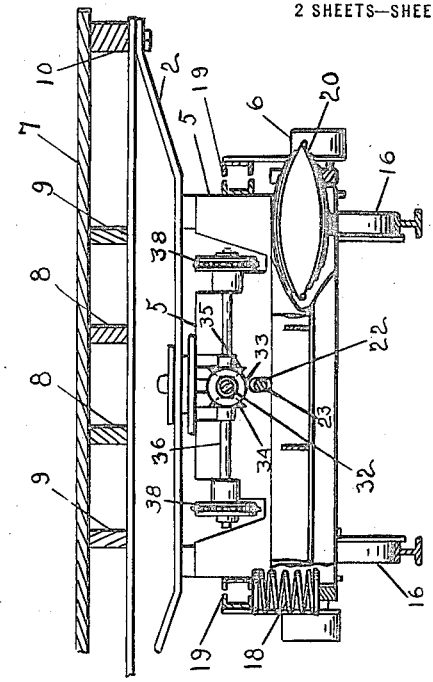
INVENTOR
Henry Clinton Tully
BY
Geo E Kirk
ATTORNEY

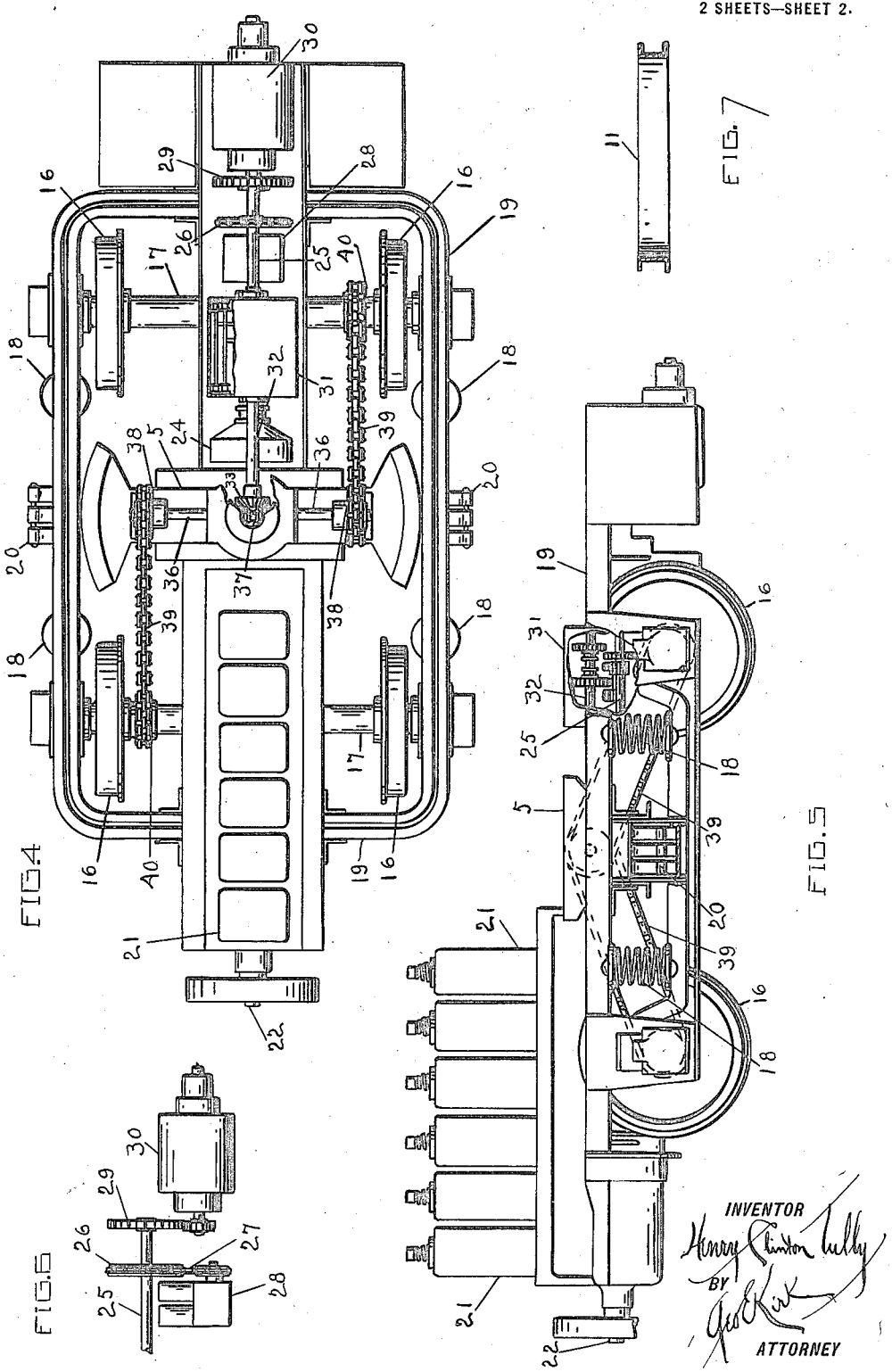

UNITED STATES PATENT OFFICE.

HENRY CLINTON TULLY, OF TOLEDO, OHIO.

RAILWAY MOTOR-CAR.

1,215,083.

Specification of Letters Patent.

Patented Feb. 6, 1917.

Application filed July 26, 1915. Serial No. 41,837.

*To all whom it may concern:*

Be it known that I, HENRY C. TULLY, a citizen of the United States of America, residing at Toledo, Lucas county, Ohio, have invented new and useful Railway Motor-Cars, of which the following is a specification.

This invention relates to load carrying vehicles and driving motors therefor.

This invention has utility when incorporated in railway cars, especially in connection with internal combustion engines.

Referring to the drawings:

Figure 1 is a side elevation, with parts broken away, of an embodiment of the invention in a railway gasolene motor car;

Fig. 2 is a fragmentary view of the deck of the car of Fig. 1 adjacent the forward or motor truck end of the car;

Fig. 3 is a fragmentary section through the motor or driving truck and car deck.

Fig. 4 is a plan view of the driving truck, with portions broken away;

Fig. 5 is a side elevation of the driving truck, portions being broken away;

Fig. 6 is a detail showing the generator and air pump driving connections; and

Fig. 7 is a section of the car deck opening reinforcement, on the line VII—VII, Fig. 2.

The car body 1 is sustained by the body bolsters 2 carried on the truck bolster 3 of the follower truck 4 and on the truck bolster 5 of the driving truck 6. The car body connections to the trucks are similar, and may to advantage be standard Master Car Builders' construction, thereby rendering elimination of driving truck a matter possible of quick and convenient operation, should business expediency or desire so prompt.

The car deck 7 may be sustained by the center sills 8, intermediate sills 9 and side sills 10. While special equipment, even of steel structure throughout may be adapted to the driving truck herein disclosed, there is a great field in the application of the truck for motorizing equipment existing, particularly cars not acceptable for through steam or heavy train traffic. This changing over of equipment is readily acomplished, say in a wood sill car, by cutting an opening in the deck, severing the center sills 8, and fitting the opening reinforcement 11, stiffened and mounted by the sill engaging straps 12, 13, 14. The broadening of the opening reinforcement away from the truck bolster is of an extent depending upon the radii of track curves and consequent swing of the vertical reciprocating type of gas engine with the truck and as to the car body. For short radii curves, as in making street corners in highway service, wider opening in the reinforcement 11 is required than in normal railways. The opening through the car deck 7 may have the hood 15 thereover to form a recess for the motor. The reinforcement 11, providing the motor receiving opening in the car deck 7, is so mounted as to give the car body normal strength and longitudinal rigidity.

The truck 6 comprises a plurality of pairs of wheels 16 fixed on axles 17 sustaining, through the springs 18, the truck frame 19. Centrally, transversely thereof, the frame 19 carries, through the springs 20, the truck bolster 5. As the springs 18, 20, are disposed outside of the tracks or rails, and in approximately the same planes, the transverse stability of the bolster and truck loads are coincident and rocking is minimized.

The frame 19 has mounted centrally on the inner end thereof, the internal combustion motor 21 having the driving shaft 22 extending through the enlarged opening 23 in the truck bolster 5. The clutch 24 serves to connect and disconnect the shaft 25 as to the shaft 22.

Sprocket wheel 26 (Figs. 4, 6) through the sprocket chain 27 may drive the air pump 28 for air brakes and starting the engine, while the gear wheel 29 may drive the generator 30 for supplying ignition circuits, lighting, etc. These devices are disposed for short transmission connections as to the motor and in counterbalancing relation on the frame.

The shaft 25, through the variable speed transmission 31 actuates the shaft 32 driving the bevel gear 33 in mesh with the bevel gears 34, 35, on the shaft 36, and connected to drive said shaft by shifting of the splined clutch member 37 from central neutral disconnecting position into either forward or backward driving relation. Fast on the shaft 36 are the sprocket wheels 38 connected by the sprocket chains 39 to drive sprocket wheels 40 fast on the axles 17. The machinery equipment is grouped with the truck unit and is so disposed therewith as to distribute effectively the load upon a plurality of pairs of driving wheels, insuring effective tractive effort. In the grouping as disclosed, the common truck frame, not only permits compact transmission connections, but simplicity in installation and convenience in upkeep.

The car body is carried on the bolster 5, the load of which is transmitted through the springs 20 to the truck frame 19. For passenger service, the car body is resiliently carried as to the driving motor, and is free from vibration and noise transmission therefrom to a degree materially increasing the comfort of travel. The motor equipment itself, however, is not subjected to the vibrations of track irregularities, for the springs 18 carrying the truck frame 19 absorb such concussions and contribute to long life for the motor and connections, as well as low upkeep expense.

What is claimed and it is desired to secure by Letters Patent is:

1. A car body, a truck having pivotal connection therewith, said truck embodying a plurality of pairs of wheels, a motor actuated first shaft, a second shaft at an angle to the first shaft and driven thereby, said shafts having their axes disposed in a common plane, a variable speed transmission device between the motor and first shaft, and driving connections oppositely extending from the second shaft on opposite sides of the motor shaft to the different pairs of wheels, said second shaft and first shaft forming an angle approximating the axis of the pivotal connection of the truck to the car body.

2. A car body, a truck having a truck bolster transversely of the car body, wheels for the truck midway as to which wheels said bolster is disposed, and a motor on the truck provided with a drive shaft for said truck extending toward the bolster, said truck movable relatively to the car body, and said car body having an opening for the motor toward one end of the car body from the truck bolster.

3. A car body having an opening therethrough broader near one end thereof, a sustaining truck for the body having a truck bolster transverse of the body laterally of which bolster the opening extends.

4. A car body having an opening, an opening reinforcement broadening toward one end thereof, a sustaining truck for the body having a truck bolster transverse of the body laterally of which bolster the opening extends.

5. A car body, a truck therefor embodying a truck frame, and a bolster coincidentally stable with the truck frame transversely of the car body, and a vertical motor for driving said truck mounted on the truck frame within the length of the car body toward one end of the truck from the bolster, said car body being mounted on the bolster whereby a follower truck may be substituted for a driving truck.

6. A car body provided with a reinforced opening, a truck, a motor mounted on the truck and projecting into the opening, a truck bolster having connection with the car body toward one end of the truck from the motor whereby in the swing of the truck as to the car body the end of the motor nearer the bolster has least movement in the opening of the car body.

7. A truck having a bolster, a car body connected to the bolster having an opening widening away from the bolster, and a motor mounted parallel with the length of the car body on the truck and protruding through said opening whereby in the swing of the truck as to the car body the end of the motor away from the truck bolster has the greatest movement in the opening of the car body.

8. A truck frame, wheels for the truck frame, means for yieldably mounting the truck frame on the wheels, a truck bolster, means coincidentally stable for yieldably mounting the bolster on the truck frame, a motor disposed parallel with the length of the truck frame upstanding therefrom and mounted thereon, a car body carried by the bolster and having an opening widening away from the bolster through which opening the motor extends.

9. First and second trucks, a car body mounted thereon and projecting to overhang said trucks at each end of the car body, the first of said trucks embodying a truck frame and a bolster, and a vertical reciprocating engine mounted on the truck frame independently of the bolster laterally of the bolster connection to the car body, said engine being disposed on the first truck between its bolster and the second truck.

10. A car body having an opening therein, a body bolster adjacent said opening and a unit consisting of a truck frame and superimposed engine separable as a unit from the car body independently of the bolster, the engine protruding into the car body opening, said engine mounted on the truck frame independently of the car body intermediate the length of the car body and extending away from said bolster.

11. A car body, a truck having vertical axis pivotal connection therewith, said truck embodying pairs of wheels, axles fixed therewith, a first shaft, a second shaft adjacent the pivotal connection between the truck and car body and at an angle to the first shaft and driven thereby, said shafts having their axes disposed in a common plane, a motor for actuating the first shaft, a variable speed transmission device between the motor and first shaft, and on opposite sides of the first shaft, driving connections oppositely extending from the second shaft to a plurality of axles.

12. A railway car body having a recess therein, a truck having, away from the center of said recess, a truck bolster provided with pivotal connection to the car body transversely of the car body, said truck including a truck frame, wheels for the truck centrally of which wheels said bolster is disposed, and a motor provided with a drive shaft for said truck extending toward the bolster, said motor being mounted on the truck frame independently of the car body and protruding into the recess of the car body toward one end of the car body from the truck bolster.

13. A car body, a truck unit embodying wheels, axles for the wheels, a truck frame having pivotal connection with the car body, a motor mounted on the truck frame independently of the axles, and spring means yieldably sustaining said truck frame, said motor being within the length of the car body and protruding thereinto entirely at one side of the vertical plane through the pivotal connection transversely of the car body.

14. A car body having an opening therein, a truck having a bolster transversely of the car body and to one side of said opening, wheels for the truck midway between which said bolster is disposed, a motor mounted on the truck and protruding into said opening in the car body, and devices carried by the truck to be driven by the motor, said devices clearing the car body, said motor being toward one end of the truck from the truck bolster, and said devices being toward the other end of the truck from the truck bolster.

In witness whereof I affix my signature.

HENRY CLINTON TULLY.